May 7, 1935. J. L. ANDERSON 2,000,007
TORCH CUTTING OR WELDING APPARATUS
Filed Dec. 5, 1933
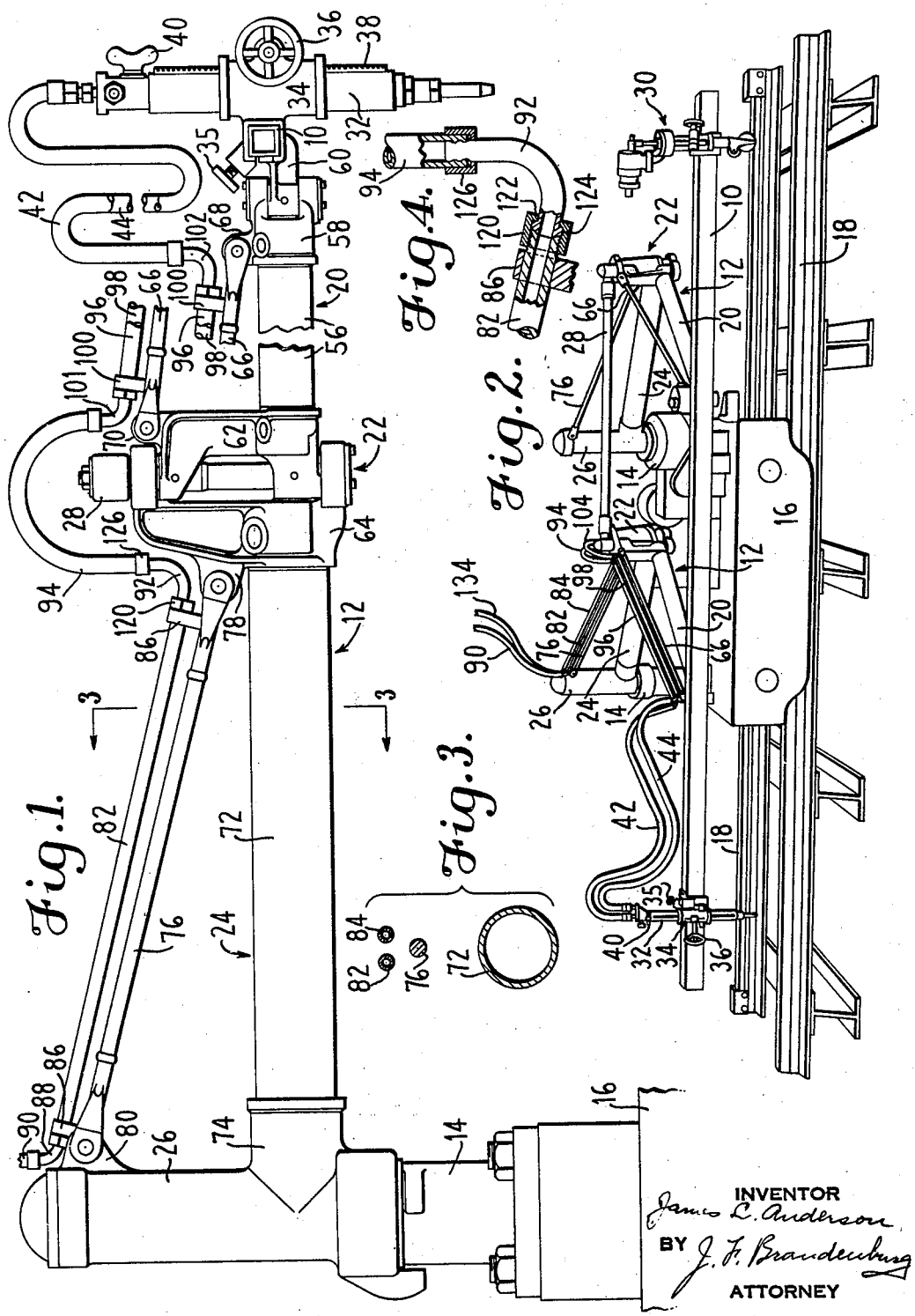
INVENTOR
James L. Anderson
BY J. F. Brandenburg
ATTORNEY Patented May 7, 1935

2,000,007

UNITED STATES PATENT OFFICE 2,000,007

TORCH CUTTING OR WELDING APPARATUS

James L. Anderson, Closter, N. J., assignor to Air Reduction Company, Incorporated, New York, N. Y., a corporation of New York Application December 5, 1933, Serial No. 700,949

11 Claims. (Cl. 266—23)

This invention relates to cutting or welding apparatus of the type having a torch support movable about a pivot connection to permit travel of the torch over the work.

In universal machines, and some other types, the torch is moved by a tracer, this term being used in a broad sense to include steerable driving wheels which run on the surface of a drawing or print, or driving wheels which are steered to cause the torch to follow a course laid out on the work, or driving means which follow a template or other pattern. Positive torch driving means are known, such as a toothed tracer wheel following and meshing with a toothed template, but the great majority of tracers depend on friction with the template or supporting surface. Undue resistance to the movement of the torch is sometimes sufficient to cause the tracer wheel to slip and the torch to slow down or stop, with the result that the work is damaged.

An object of this invention is to provide means for supplying gas from a stationary source to a movable torch without obstructing the movement of the torch regardless of the extent or direction of such movement within the operating range of the machine. The invention insures against slipping of the tracer, and consequent irregular movement of the torch caused by gas hoses which drag or in other ways increase the resistance to be overcome in moving the torch.

Another object of the invention is to provide a swinging torch support with an improved gas conduit which is less liable to damage, more resistant to wear, and neater in appearance than the gas conduits of the prior art. The invention is particularly advantageous with jointed-arm torch supports such as are commonly used on certain types of universal cutting machines.

Other objects, features and advantages of the invention will appear or be pointed out as the specification proceeds.

In the accompanying drawing:

Fig. 1 is a side elevation showing part of a cutting or welding machine embodying the invention;

Fig. 2 is a reduced, perspective view of a complete machine including the structure shown in Fig. 1;

Fig. 3 is a sectional view on the line 3—3 of Fig. 1; and

Fig. 4 is an enlarged sectional view showing the connection of a hose to a pipe conduit.

The drawing shows the invention embodied in a universal cutting machine of the folding parallelogram type, but it can be applied to any other cutting or welding machine having a pivotally supported arm. In the machine illustrated, a front bar 10 has pivot connections with jointed supporting arms 12, which are pivotally supported by posts 14 secured to a base 16. The base shown in Fig. 2 is a carriage movable along a track 18.

Each of the jointed arms 12 comprises a forward link 20 having a pivot connection 22 with a rearward link 24 which has a bearing sleeve 26 surrounding one of the posts 14. The jointed arms are connected by a link 28. This folding parallelogram cutting machine is similar to that shown in my patent application, Serial No. 668,008, filed April 26, 1933.

A tracer 30 is clamped to the front bar 10 in position to operate over a drawing or pattern table, not shown. A torch 32 is supported by a torch holder 34, which is slidable along the bar 10 and clamped in position by a clamping screw 35. The torch directs a gas jet against the work, which is not shown in the drawing but is placed just in front of the tracks 18.

The torch 32 can be moved vertically in the torch holder 34 to adjust the spacing of the torch tip from the work. A hand-wheel 36 operates a pinion which meshes with a rack 38 on the torch and moves the torch up and down in its holder 34.

The supply of cutting oxygen entering the torch is controlled by a valve 40. An oxygen hose 42 and an acetylene hose 44 are connected with the torch. These hoses 42 and 44 are sufficiently flexible so that they offer little resistance to the vertical movement of the torch 32 in its holder 34. The hoses 42 and 44 are long enough to allow the torch to be moved into different positions on the bar 10 when the clamping screw 35 is released.

The jointed arm 12 is shown in detail in Fig. 1. The forward link 20 comprises a tubular portion 56 fastened to an end casting 58, which is pivotally connected with a bracket 60 of the front bar 10, and an end casting 62 which is joined by the pivot connection 22 with an end casting 64 of the rearward link 24. The forward link 20 also includes a tension member 66 extending at an angle to the tubular portion 56 and pinned to lugs 68 and 70 on the end castings 58 and 62, respectively.

The rearward link 24 comprises a tubular portion 72 fastened at one end to the end casting 64 and extending at its other end into a T-fitting 74, which forms an integral part of the bearing sleeve 26. This T-fitting and bearing sleeve comprise the rearward end casting of the link 24. The link 24 also includes a brace or tension member 76 which has its opposite ends connected by pins to lugs 78 and 80 on the end casting 64 and bearing sleeve 26, respectively.

Pipe conduits 82 and 84 (Fig. 3) extend parallel to each other and to the tension member 76. These conduits are supported by brackets 86 (Fig. 1) secured to the tension member 76. The pipe conduit 82 has a bent hose couple 88 connected to its upper end, and this couple is connected with a hose line 90 leading from an oxygen storage cylinder or other stationary source of oxygen under pressure. The lower end of the pipe conduit 82 has a bent hose couple 92, which connects with a hose 94.

Pipe conduits 96 and 98 extend along the tension member 66 and are supported from it by brackets 100. The pipe conduit 96 has a bent hose couple 101 at its upper end connected to the hose 94 which comprises a flexible joint between the rigid conduits 82 and 96. A bent hose couple 102 connects the conduit 96 with the hose 42.

A hose 104 (Fig. 2) connects the pipe conduits 84 and 98 and comprises a flexible joint between these pipe conduits at the pivot connection 22.

When the forward link 20 swings on the pivot connection 22, the hoses 94 and 104 must yield. Each of these hoses has a U-bend in a plane which is substantially parallel to the axis of the pivot connection 22, so that the yielding movement of the hose is principally a twisting rather than a bending movement and offers little resistance to the movement of the links at the pivotal connection 22. This twisting movement is distributed throughout a substantial length of the hose, and no part of the material of the hose is distorted sufficiently to cause any substantial wear. The hoses 94 and 104 can be located in other planes, but any plane not substantially parallel to the axis of the pivot connection 22 causes more bending of the hoses and tends to increase the wear.

Fig. 4 shows the connections of the bent hose couple 92 to the pipe conduit 82 and the hose 94. A bevel face on the end of the hose couple 92 is held firmly against a complementary face on the end of the pipe conduit 92 by a nut 120 which threads onto the end of the pipe conduit 82 and has an inwardly extending shoulder 122 bearing against a collar 124 on the hose couple.

The other end of the hose couple has circular corrugations and the hose 94 is securely clamped over this corrugated end by a metal ferrule 126. The other hose couples and their connections are similar to those shown in Fig. 4.

The hose 90 at the rearward end of the jointed arm and the hoses 42 and 44 at the torch end of the arm extend substantially vertically so that their distortion when the arm swings or folds is principally a twisting movement. This reduces wear on the hose and causes the hose to offer a minimum of resistance to the swinging and folding of the jointed arm. The hose 90, which connects with some stationary source of oxygen, and a hose 134 (Fig. 2), which connects the pipe conduit 84 with a stationary source of fuel gas, are connected with the pipe conduits so close to the pivot axis of the bearing sleeve 26 that there is very little transverse movement of the hoses 90 and 134 during the operation of the machine.

The pipe conduit portions make the gas conduits of this invention less liable to damage than are gas conduits with rubber hose throughout their entire length. The combination is neater in appearance than machines of the prior art and has the practical advantages that there is no hose extending up from the torch to a stationary support above the torch and limiting the travel of the torch, or dangling from the swinging arm and likely to catch on some obstruction and stop or retard the movement of the torch.

The preferred embodiment of the invention has been described but it can be changed and modified, and some features of the invention can be used with or without other features, without departing from the invention defined in the claims.

I claim:

1. In a torch cutting or welding machine having a jointed arm for supporting a torch for universal movement in a plane, a conduit for supplying gas to the torch, said conduit including a section connected by brackets to each link of the jointed arm to move as a unit with the link, and a flexible portion at the joint connecting the sections carried by the respective links of the jointed arm.

2. A universal cutting or welding machine including a jointed torch supporting arm, two gas conduits above the arm for supplying oxygen and fuel gas to the torch, each conduit having a section extending along each link of the jointed arm and a flexible connecting portion at the joint of the arm, and brackets supporting the conduits from said jointed arms.

3. Cutting or welding apparatus comprising a jointed arm for supporting a torch for movement in any and changing directions in a plane, a gas conduit having a section extending along each link of the jointed arm, outside of the arm, brackets on the arm supporting said sections of the gas conduit, and a flexible connection between the sections of the conduit comprising a hose having a U-bend in a plane substantially parallel to the pivotal axis of the joint connecting the links of the arm.

4. In a universal cutting or welding machine having a jointed arm for supporting a torch for universal movement in a plane, means for supplying oxygen and fuel gas to the torch comprising two gas conduits extending along the links of the arm outside of and above the links, and having flexible hose portions bridging the joint of the arm and lying in planes substantially parallel to the pivotal axis of the joint, and brackets supporting the conduits from the jointed arm.

5. In a cutting or welding machine, a torch supporting arm having swinging movement about a substantially vertical pivotal axis, means for conveying gas to the torch comprising a pipe conduit extending along and connected with the arm to swing as a unit with the arm, hose means connecting one end of the pipe conduit with the torch, and a flexible conduit section at the pivotal axis for connecting the pipe conduit with a source of gas beyond said pivotal axis.

6. In a torch cutting or welding machine, a supporting arm comprising an end casting movable about a pivotal axis, a forwardly extending portion rigidly connected to the end casting and a brace extending at an angle to the forwardly extending portion and connected with said portion and end casting to brace these parts against relative movement in a vertical plane, a pipe conduit extending along the brace and connected to said supporting arm to move with it as a unit, and a flexible conduit section connected to the pipe conduit adjacent the pivotal axis of said supporting arm.

7. A cutting or welding machine comprising a jointed arm, a pipe conduit extending along the outside of each link of the arm, and a flexible connection between the pipe conduits at the joint of the arm.

8. A cutting or welding machine comprising a jointed arm, a pipe conduit extending along the outside of each link of the arm, and a flexible hose in the shape of a U-bend bridging the joint between the links and connecting said pipe conduits.

9. In a cutting or welding machine, a torch supporting arm comprising two links with a pivot connection between them, two separate pipe conduits extending along each link, brackets connecting the conduits with the link, and flexible hose connections bridging the pivot connection and joining the ends of the corresponding pipe conduits on the respective links.

10. In a universal cutting or welding machine, a torch supporting arm including two links joined by a pivot connection and each having an angularly extending tension member bracing it against distortion in a vertical plane, a pipe conduit extending along each tension member, a flexible hose bridging said pivot connection, and means connecting opposite ends of the hose with the pipe conduits on the respective links.

11. In a universal cutting or welding machine, a torch supporting arm including two links joined by a pivot connection and each having an angularly extending tension member bracing it against distortion in a vertical plane, two pipe conduits extending along each tension member, brackets connecting the pipe conduits with the tension members, and means for connecting each of the pipe conduits of one link with the corresponding pipe conduit of the other link, said means including flexible hoses bridging the pivot connection between the links.

JAMES L. ANDERSON.